Aug. 28, 1934.  F. I. GETTY  1,971,341

LIGHT AND SIGNAL CONTROL FOR VEHICLES

Original Filed Nov. 1, 1930    5 Sheets-Sheet 1

Inventor
Fred I. Getty

By Brown & Phelps
Attorneys

Aug. 28, 1934.   F. I. GETTY   1,971,341
LIGHT AND SIGNAL CONTROL FOR VEHICLES
Original Filed Nov. 1, 1930   5 Sheets-Sheet 2
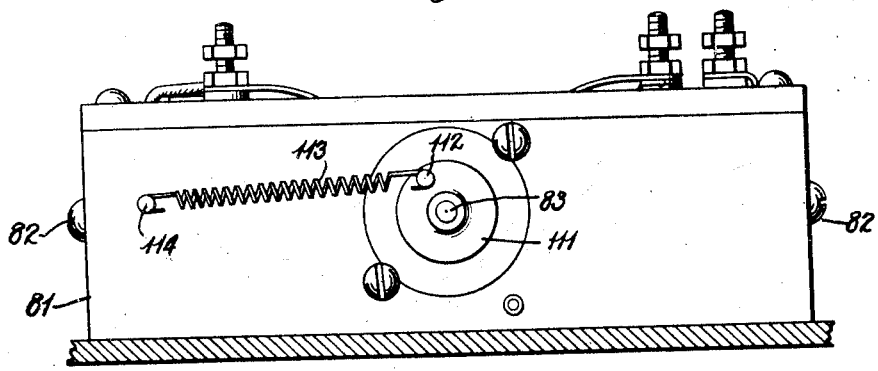
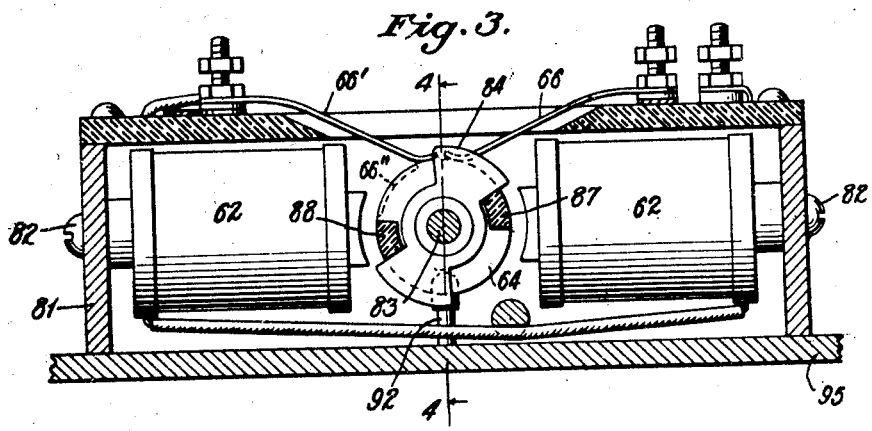
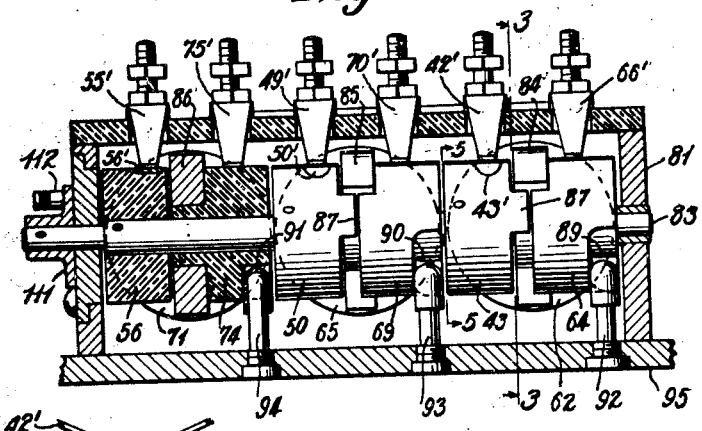
Inventor
Fred I. Getty
By Brown + Phelps
Attorneys Aug. 28, 1934.     F. I. GETTY     1,971,341
LIGHT AND SIGNAL CONTROL FOR VEHICLES
Original Filed Nov. 1, 1930     5 Sheets-Sheet 3

Inventor
Fred I. Getty
By Browne Phelps
Attorneys

Aug. 28, 1934.     F. I. GETTY     1,971,341
LIGHT AND SIGNAL CONTROL FOR VEHICLES
Original Filed Nov. 1, 1930     5 Sheets-Sheet 4
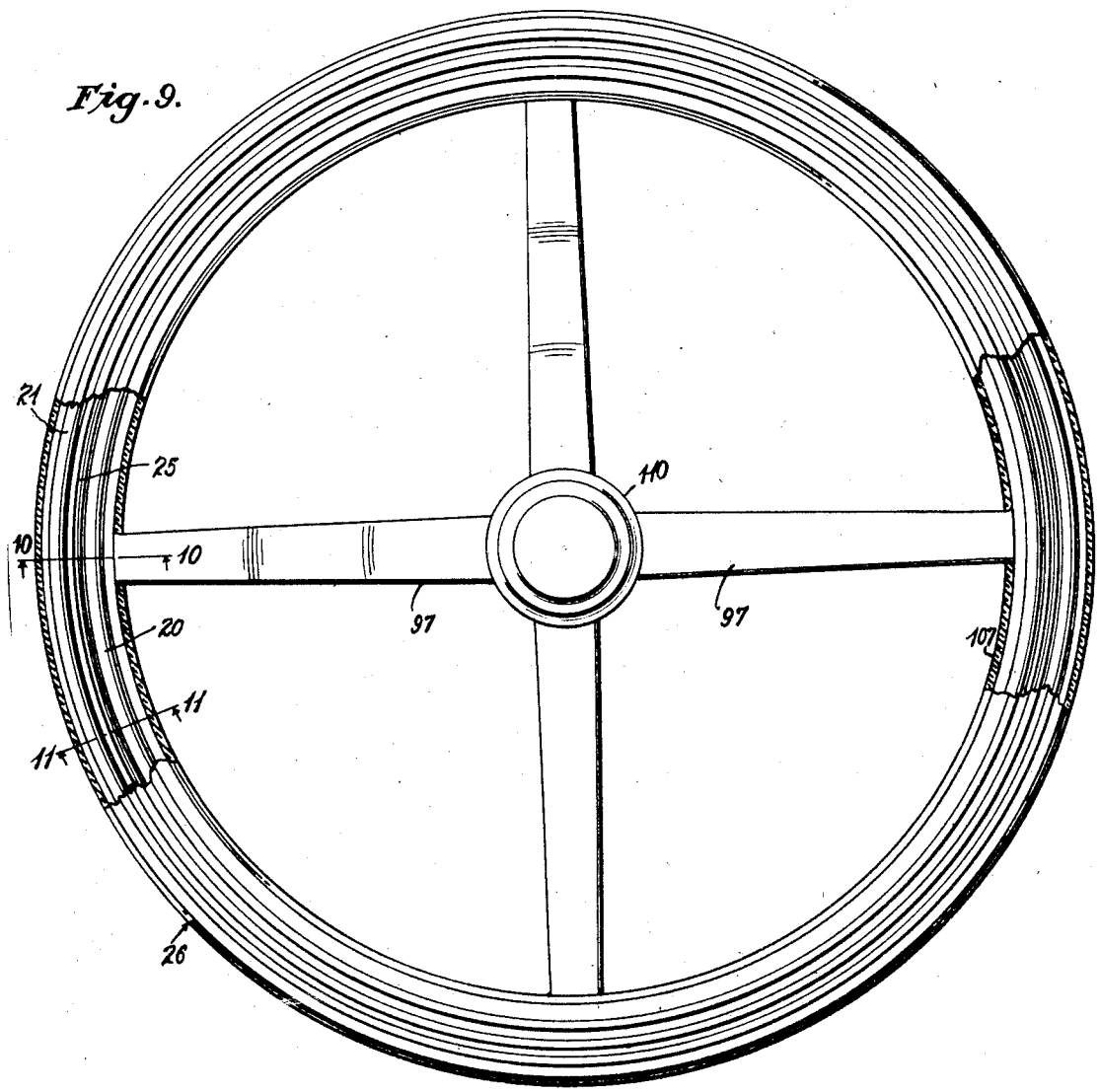
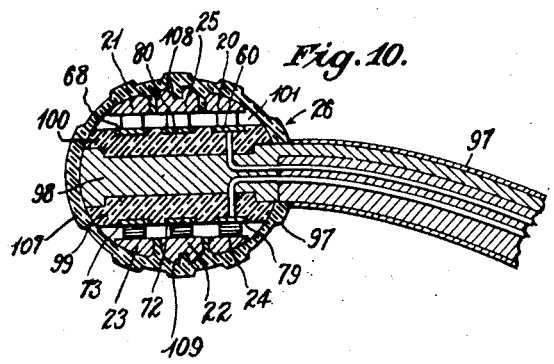
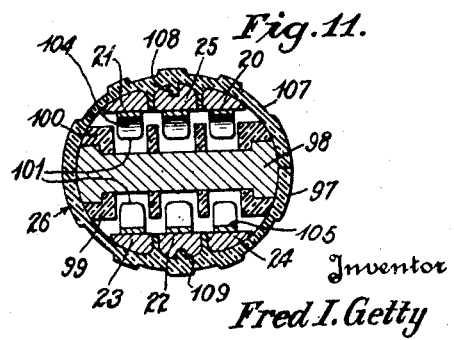
Inventor
Fred I. Getty
By Brown & Phelps
Attorneys

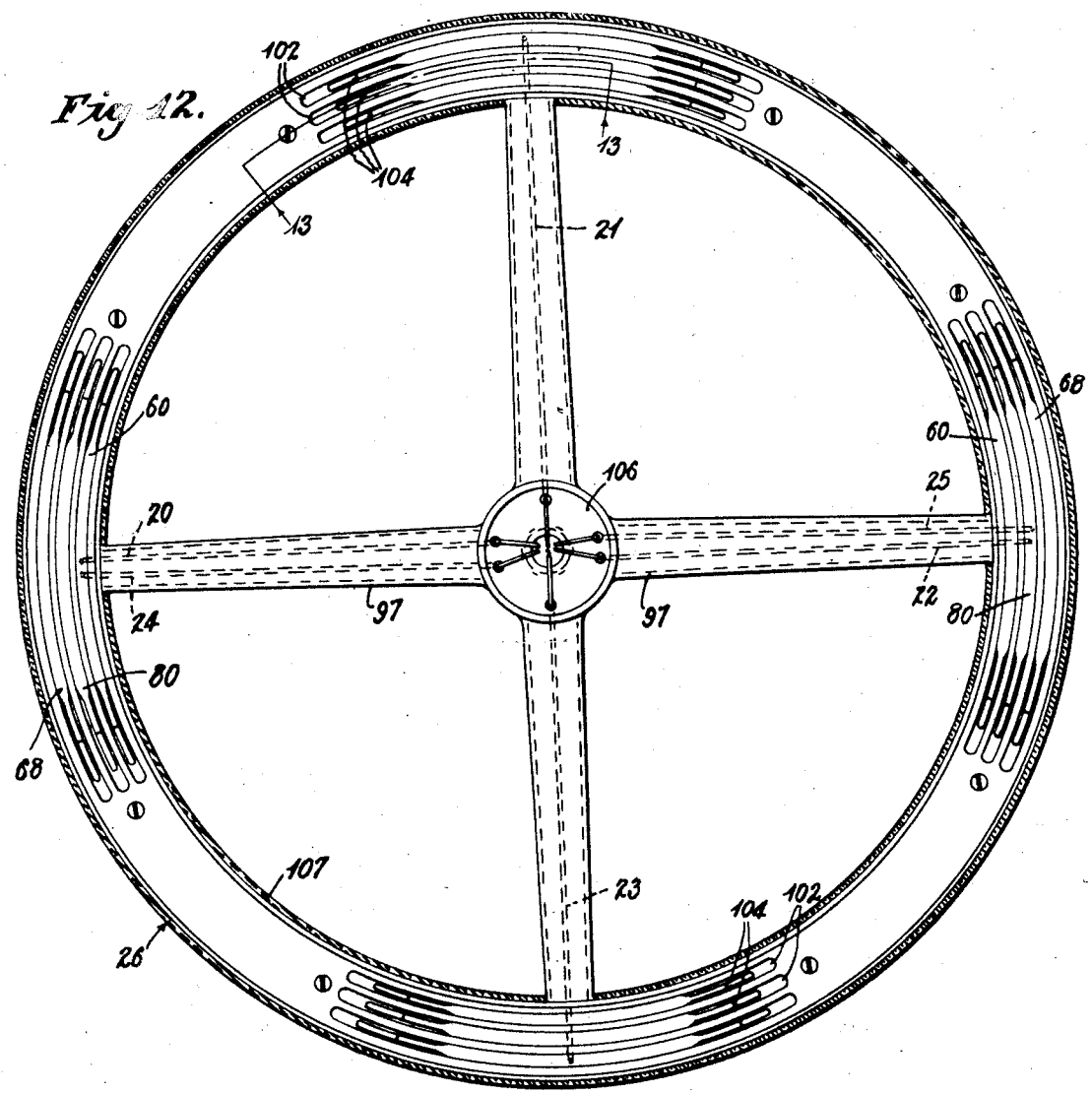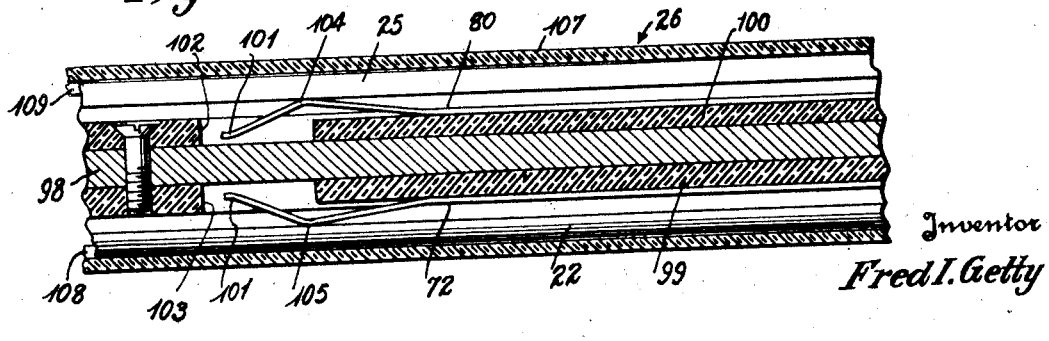

Patented Aug. 28, 1934

1,971,341

UNITED STATES PATENT OFFICE 1,971,341

LIGHT AND SIGNAL CONTROL FOR VEHICLES

Fred I. Getty, Jennings, La.

Application November 1, 1930, Serial No. 492,803
Renewed September 26, 1933

14 Claims. (Cl. 171—97)

The invention relates to control of the lights and signals of vehicles and has as an object the provision of a system and of apparatus for accomplishing this end.

Automobile lighting systems of which I am aware have required an exertion by the driver to dim or otherwise change the character of the light when meeting another vehicle, which exertion includes a movement of one hand from its grip on the wheel. The same is true of manually operated signal lights and to some extent of the horn.

Because of the inconvenience, it is rather usual with drivers not to dim or tilt the rays of their headlights when meeting other drivers and not to favor use of direction signalling devices. It is true that horn circuit closers have been located on the steering wheel requiring the hand to be shifted and to fumble therefor if the hand is moved from a certain position on the wheel while driving. It is also true that attempts have been made to provide a circuit closer which may be operated at any point on the circumference of the wheel. The latter attempts have been of such a character as to be incapable of duplication to provide for the number required for operation of all desirable changes of lights and display of signals. It is believed that use of the system and/or apparatus of the present invention will make manipulation of lights and signals so easy that the average driver will operate his vehicle with greatly increased safety to himself and others.

It is therefore an object of the invention to provide a system wherein the nature of the light with which the vehicle is moving may be changed according to the needs of movement with the greatest convenience.

It is a further object of the invention to provide a system wherein any desired character of light may be brought into use momentarily and easily.

It is a further object of the invention to provide a system wherein any desired light provided by the illuminating system of the vehicle may be used continuously and the light in use may be momentarily replaced by any other desired running light with sufficient ease to not deter the introduction of such a change when it is desirable.

It is a further object of the invention to provide a system of lighting and of signals all under control of the fingers of the operator without movement of either hand from its grip upon the steering wheel.

It is a further object of the invention to provide a novel form of electro-magnetic switch for use in the system.

It is a further object of the invention to provide a novel form of circuit closers carried by the steering wheel of the vehicle for use in the system.

Further objects of the invention will appear from the following description when read in connection with the accompanying drawings showing an illustrative embodiment of the invention and wherein:—

Fig. 2 is an end view of a magnetic switch removed from its housing;

Fig. 3 is a transverse section on line 3—3 of Fig. 4;

Fig. 4 is a vertical section on line 4—4 of Fig. 3, parts being shown in elevation;

Fig. 5 is a detail end view of the moving part of the magnetic switch taken on section line 5—5 of Fig. 4;

Fig. 9 is a plan view of a steering wheel equipped with circuit closers for control of the system;

Figs. 10 and 11 are transverse sections respectively upon an enlarged scale taken on line 10—10 and 11—11 of Fig. 9;

Fig. 12 is a plan view corresponding to Fig. 9 with the covering, the circuit closing rings of the steering wheel and the cap at the hub thereof removed.

Fig. 13 is a detail section on line 13—13 of Fig. 12 upon an enlarged scale.

Figure 1:
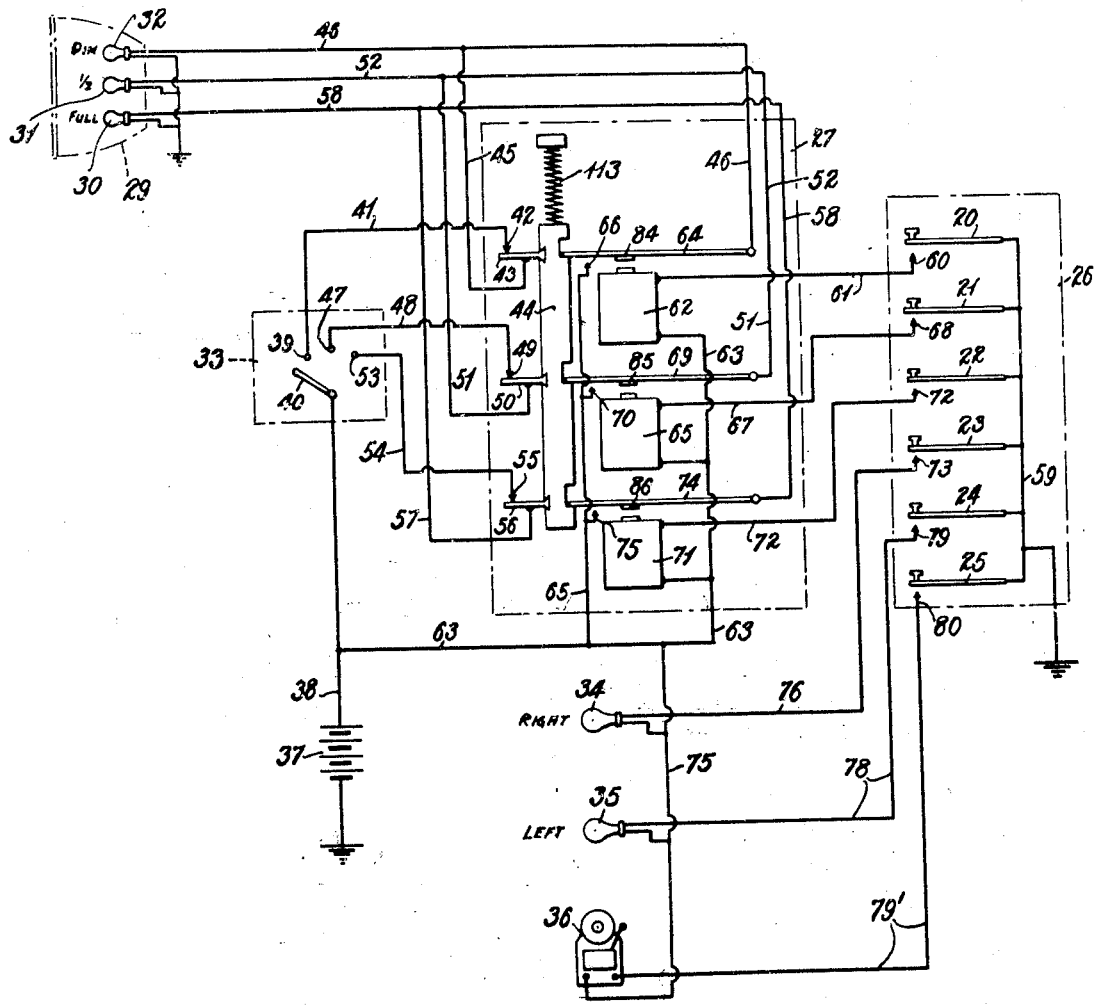
Fig. 1 is a diagrammatic view of the circuits.
Figure 6:
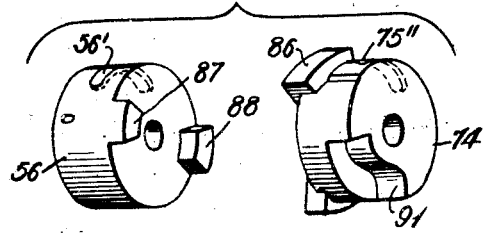
Fig. 6 is a separated perspective view of a pair of coacting elements of the movable part of the magnetic switch.

As shown in Fig. 1, the system comprises a plurality of circuit closers 20—25 inclusive preferably located in the steering wheel of the vehicle and the said circuit closers are therefore shown as surrounded with dotted lines 26 to indicate that the mechanism contained therein is the portion of the system so located.

The system further comprises an electro-magnetic switch housed in a casing 27 preferably located at or adjacent the lower end of the steering column 28 of the vehicle, the housing being indicated by dotted lines in Fig. 1. The system further provides headlights, one only of which is shown at 29, equipped with three separate lamps 30, 31, 32, although the filaments of lamps 30 and 31 may be, and preferably are, enclosed in a single bulb in the center of the reflector of the lamp as is the usual practice at present. The lamp 32 is desirably placed adjacent the upper forward edge of the reflector as is also usual.

The system further embodies a manual switch 33 shown in dotted lines in Fig. 1 which may be controlled by a lever situated upon the steering column just below the steering wheel in a usual manner. Also the system provides right and left hand turn signal lamps 34, 35 and an audible signal 36 as a bell or horn.

The switch 33 is shown as connected to grounded battery 37 by means of a wire 38 and the contact 39 of the switch may be placed into connection with the battery by means of switch blade 40 closing a circuit through wire 41, contact 42, member 43 fixed on bar 44, wires 45, 46 and the grounded lamp 32 which may be the dim light of the headlight. The half-bright or tilt-ray lamp 31 may be connected to battery by means of switch blade 40, contact 47, wire 48, contact 49, movable member 50, also fixed on bar 44, and wires 51, 52. The bright light 30 may be placed into operation by moving the switch blade 40 to contact 53 completing the circuit through wire 54, contact 55, movable contact 56, fixed on bar 44, wires 57, 58. With any one of the lamps mentioned in operation, the circuit may be broken and the same or another lamp lighted momentarily by pressure upon a desired circuit closer 20, 21, or 22. Assuming that the bright lamp 30 is in operation and the dim lamp 32 is desired, the driver would then press upon circuit closer 20 closing a circuit from ground through wire 59, circuit closer 20, contact 60, wire 61, magnet 62, wires 63, 38 to battery. The magnet 62 being energized pulls down upon lever 64 thus breaking all of the circuits from switch 33 by separating contacts 42, 43 and 49, 50, and 55, 56 against the tension of spring 113. At the same time a circuit is closed from the battery through wires 38, 63, 65, contact 66, lever 64, wire 46 to lamp 32. When the circuit closer 20 is allowed to open, spring 113 returning the bar 44 will again close the circuit through switch 33 so that the existing circuit at the time of the pressure of the lever 20, will be restored. In a like manner pressure upon circuit closer 21 will energize magnet 65 through wire 67, contact 68, to draw down lever 69 to break any existing circuit through the lamps and to close a circuit through contact 70, lever 69, wire 52 to lamp 31. Operation of the circuit closer 22 will energize magnet 71 through wire 72 and contact 73 to pull down upon lever 74 and energize lamp 30 through wires 63, 65, contact 75, lever 74, and wire 58. It will be seen that a chosen lamp may be energized momentarily whether switch 33 is open or closed and that if switch 33 is closed upon any contact, the lamp in operation will be momentarily interrupted and the chosen lamp substituted therefor.

To display signals for right and left hand turns circuit closer 23 will close a circuit from battery 37 through wires 38, 63, 75, lamp 34, wire 76, contact 77, lever 23, wire 59 to ground. Circuit closer 24 closes a like circuit through wire 75, lamp 35 to wire 78 and contact 79. Circuit closer 25 energizes the audible signal 36 over wires 75, 79′ and contact 80.

A form of electro-magnetic switch for use in the system is shown in Figs. 2 to 7 inclusive as comprising a frame 81 of preferably magnetic material having three pairs of magnet coils 62, 65, and 71, mounted therein as by screws 82 whereby the frame connects the ends of the cores for magnetic flux return. A shaft 83 which in function corresponds to bar 44 of Fig. 1 is shown as journaled in the frame upon an axis extending between the poles of the magnets and carrying upon its outer end a disc 111 pinned to the shaft and provided with a pin 112 engaging a tension spring 113 anchored at 114 upon the frame. The shaft 83 is shown as fixedly carrying three blocks 43, 50, 56 which correspond to the similarly numbered elements of Fig. 1, the said blocks being pinned to the shaft. Cooperating with each of these blocks are movable blocks 64, 69, 74 free on shaft 83, each of said last named blocks bearing one of the armatures 84, 85, 86 rigid therewith. The armatures are each shown as projecting from the face of its carrying block and the blocks 43, 50, 56 each carries a pair of projections 87, 88 projecting into a position to be contacted by the adjacent armature.

In each of the blocks 64, 69, 74, there is a recess 89, 90, 91, and into each of said recesses projects a stop pin 92, 93, 94 fixed to plate 95 forming one wall of the housing 27. To close the circuits from switch 33 to lamps 30, 31, 32 there are shown bridging plates 43′, 50′, 56′ bridging the contact springs 42, 42′, 49, 49′, 55, 55′, respectively. When a selected magnet 62, 65, 71 is energized the corresponding block 64, 69 or 74 is caused to revolve upon the shaft 77 and by virtue of the projections 87, 88, the revolution of the block 64, 69, or 74 causes revolution of the shaft 82 against the tension of the spring 113. All of the circuits including springs 42, 49, 55 are therefore broken and a bridging contact 66″, 70″, or 75″ is then caused to bridge the selected pair of springs 66, 66′, or 70, 70′, or 75, 75′, which contacts correspond to the circuits through levers 64, 69 and 74, of Fig. 1.

When the circuit through the selected magnet is broken by opening the circuit closers 20, 21 or 22, the spring 113 returns the shaft 83 and each of the blocks 43, 50, 56 to normal against the stop pins 92, 93, 94.

Figure 7:
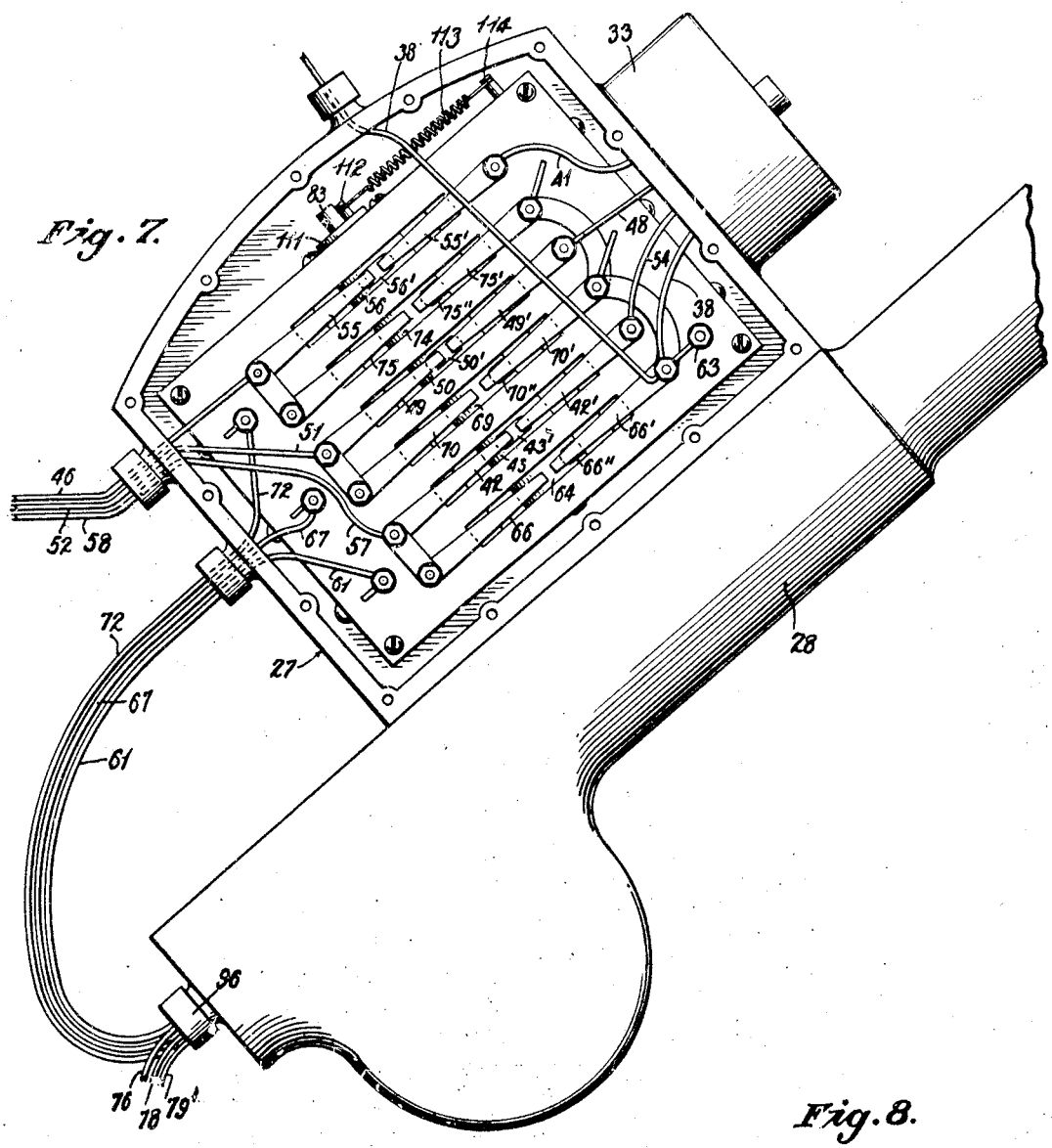
Fig. 7 is a detail side elevation of the lower end of a steering column showing the magnetic switch in plan view in its housing, the cover of the housing being removed.
Figure 8:
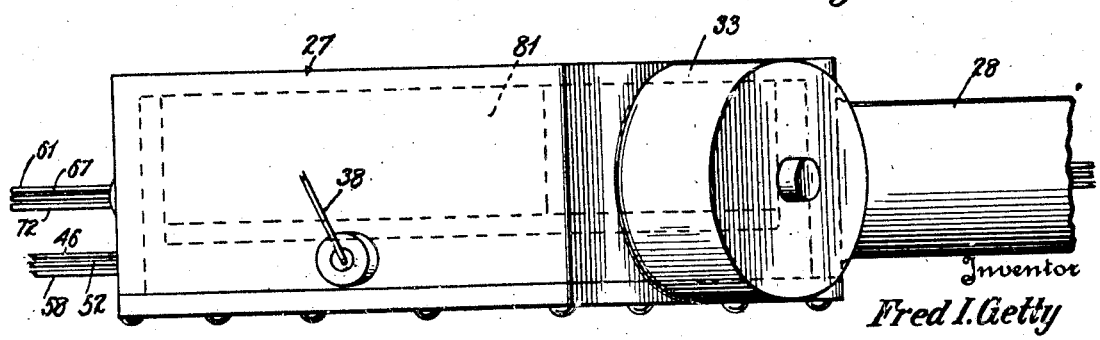
Fig. 8 is a plan view of the structure of Fig. 7.

The wires shown in Fig. 7 have been numbered in accordance with the diagrammatic showing of Fig. 1. In the embodiment there shown the wires leading out of the steering column 28 are shown as surrounded by a sealing gland 96.

In Figs. 9 to 13 inclusive there is shown a form of steering wheel containing circuit closers for the control of the system. As shown the steering wheel comprises spokes 97 and a rim 26 having a metallic core 98 in metallic connection with the spokes and provided with rings of insulation 99, 100 each carrying upon opposite sides contact plates 60, 80, 68, and 73, 72, 79, numbered in Fig. 10 in the preferred arrangement of the corresponding fixed contacts of Fig. 1.

Each of said contact plates is shown as multiplied, there being four plates corresponding with each number upon each side of the insulating rings 99, 100. One end of each of one of said plates 72 and 80 are shown in detail in Fig. 13, the said plates being formed of resilient material having their extremities 101 projecting into openings 102, 103 in the insulating rings 99, 100 to a position to be depressed into contact with the metallic core 98, adjacent said extremities. The plates are shown as displaced upwardly at 104, 105, at which points they contact with and support the rings 20—25. By virtue of this arrangement, pressure upon one of the rings 20—25 at any point on the wheel will result in depressing one or more of the extremities of the contact plates corresponding to said ring to cause one of the extremities as 101 to contact with the core 98.

The rings 20—25 are preferably formed of metal and insulated from each other and therefore contact of any one of the plates 60, 68, 73, 77, 79 or 80 will result in connecting the corresponding wire 61, 67, 72, 76, 78 or 79' to ground, the current flowing from the grounded contact plate through the ring to a corresponding wire extending through the spoke of the wheel as indicated in Fig. 12. The ends of said wires are shown as being brought out into an annular recess 106, in the hub of the steering wheel, each of said wires being desirably connected to the socket in said hub and corresponding wires are carried through the hollow steering column and have their ends engaging in said sockets.

The core 98, the insulating rings 99, 100 and the depressible rings 20—25 are indicated as entirely covered by means of an outer casing 107 of flexible material as partially vulcanized rubber. To preserve the relation of the rings to the cover and to the contact plates, the central rings 22 and 25 are shown as each formed with a channel 108, 109 and the interior of the casing 107 with a ridge entering said channels.

To insulate the rings 20—25 from each other the cover is also desirably formed with inwardly extending ribs extending between said rings, or separate rings of insulating material as fiber may be placed between the rings 20—25. The recess 106 is shown in Fig. 9 as being covered by a screw cap 110.

The operation of the device will be clear from the above description. Briefly, pressure upon the lower central ring 22 will operate the bright light of the vehicle whether or not any light is already in use and if any other light is in use the same will be extinguished and the bright light will be substituted therefor. Pressure upon the ring 60 will likewise operate the dim light and upon ring 20 will operate the tilt ray or one half bright light. Pressure upon ring 25 will cause the horn to blow. Ring 23 will cause an illuminating signal to indicate right turn and ring 24 will cause a like signal indicating left turn.

Minor changes may be made in the physical embodiment of the invention or in the system of control thereof, without departing from the spirit of the invention within the scope of the appended claims.

I claim:

1. A control system for automobile lamps comprising, in combination, a plurality of lamps, a multiple pole switch to cause continuous operation of any chosen lamp, circuit closers connected for causing temporary operation of any chosen lamp and means whereby actuation of a chosen circuit closer breaks any existing circuit for said continuous operation while said chosen circuit closer remains closed.

2. A control system for automobile lamps comprising, in combination, a plurality of lamps, a multiple pole switch to cause continuous operation of any chosen lamp, a plurality of circuit closers carried by the rim of the steering wheel, switch means comprising a plurality of electromagnets controlled by the respective circuit closers, normally open circuits closed by operation of the respective magnets and connected with the respective lamps, a spring returned movable member common to said magnets and actuated by each thereof, a plurality of normally closed contacts all opened by movement of said member, each pair of said last named contacts in series with one of the circuits through said first named switch and said lamps, whereby operation of a chosen circuit closer will break any existing circuit through one of said lamps and complete a circuit to a chosen lamp while the circuit closer is held closed.

3. A control system for automobile devices comprising, in combination, a plurality of electrical devices, a battery, a pair of parallel circuits from said battery to each of certain of said devices, a single circuit to other of said devices, a multipolar switch for continuous closure of any one of the parallel circuits through a chosen one of said first named devices, a plurality of electromagnets, means actuated by the respective magnets to close the remaining parallel circuits, means common to all of said magnets adapted on actuation of one thereof to break each of the circuits through said first named switch and a plurality of circuit closers carried by the rim of the steering wheel connected respectively in circuit with said electromagnets and with said single circuit devices.

4. A control system for automobile devices comprising, in combination, a rotatably mounted shaft, a plurality of pairs of cylindrical blocks mounted on said shaft, one block of each pair fixed thereto and the remaining one thereof loose thereon, a lost motion connection between the blocks of each pair, resilient means to urge said shaft to normal position, an armature carried by each of said loose blocks, means carried by each fixed block to normally close a respective circuit, means carried by the loose block of each pair to close a circuit in shunt of the normally closed circuit of its mate, a plurality of electrical automobile devices, a multipolar switch for continuous closure of any of the circuits closed by said fixed blocks through a chosen device, an electromagnet for actuation of each of said armatures and normally open circuit closers connected for actuation of the respective electromagnets.

5. A control system for automobile devices comprising, in combination, a hollow steering column, a casing mounted at the lower end thereof, an electromagnetic switch housed in said casing, said switch comprising a plurality of normally closed and normally open contact means, one of each thereof in pairs, a multipolar mechanical switch also mounted at the lower end of said column, a plurality of electrical devices, a circuit from each pole of said mechanical switch through one of said normally closed contact means and one of said devices, magnets in said housing one common to each of said pairs of contact means, a plurality of conductors extending through said column and connected to the respective magnets, a plurality of normally open circuit closers carried by the rim of the steering wheel and connected to the respective conductors, resilient means to return said pairs of contact means to normal position and means common to said closed contact means and said magnets to open all of said normally closed contact means upon energization of any of said magnets and for simultaneously closing the respective open contact means, whereby to temporarily substitute actuation of a chosen accessory for existing operation of any of said devices.

6. A control system for automobile lamps comprising, in combination, a plurality of lamps, a multiple pole switch to cause continuous operation of any chosen lamp, a circuit from a source of energy to each lamp to be closed through one of the poles of said switch, a circuit from said source to each lamp in parallel with said first named circuits, a plurality of circuit closers each operable to close one of said parallel circuits, means to open any existing complete circuit through said switch to any of said lamps upon closure of any of said circuit closers and means to automatically restore all circuits to the condition existing before closing any chosen circuit closer upon the opening thereof.

7. A control system for automobile devices comprising, in combination, a plurality of electrical devices, electromagnetic switch mechanism connected for control of said devices, a housing for said mechanism carried by the steering column, a plurality of circuit closers carried by the rim of the steering wheel mounted on said column, the respective circuit closers connected to said mechanism for control of the respective devices and means whereby any of said circuit closers may be operated by pressure on said rim at the intersection of any radius of the wheel with the rim.

8. A control system for automobile lamps comprising, in combination, a plurality of lamps, switch mechanism for causing continuous operation of any chosen lamp, a circuit closer connected for causing temporary operation of a chosen lamp, and means whereby actuation of the said circuit closer breaks any existing circuit for said continuous operation, while said circuit closer remains closed.

9. A control system for automobile lamps comprising, in combination, a plurality of lamps, switch mechanism for causing continuous operation of any chosen lamp, a circuit closer located in the rim of the steering wheel and connected for causing temporary operation of a chosen lamp, and means whereby actuation of the said circuit closer breaks any existing circuit for said continuous operation, while the said circuit closer remains closed.

10. A control system for automobile lamps comprising, in combination, a plurality of lamps, a multiple pole switch to cause continuous operation of any chosen lamp, a circuit closer connected for causing temporary operation of a chosen lamp and means whereby actuation of the said circuit closer breaks any existing circuit for said continuous operation, while said circuit closer remains closed.

11. A control system for automobile lamps comprising, in combination, a plurality of lamps, a multiple pole switch to cause continuous operation of any chosen lamp, a circuit closer carried by the rim of the steering wheel and connected for causing temporary operation of a chosen lamp, and means whereby actuation of the said circuit closer breaks any existing circuit for continuous operation while said circuit closer remains closed.

12. A control system for automobile devices comprising, in combination, a plurality of electrical devices, a source of electrical energy, a pair of parallel circuits from said source to each of certain of said devices, a single circuit to other of said devices, switch mechanism for causing continuous operation of any chosen one of the first named devices, a circuit closer for causing temporary operation of a chosen device, and means whereby actuation of the said circuit closer breaks any existing circuit for said continuous operation while said circuit closer remains closed.

13. A control system for automobile devices comprising, in combination, a plurality of electrical devices, a battery, a pair of parallel circuits from said battery to each of certain of said devices, a single circuit extending to other of said devices including a circuit closer located in the rim of the steering wheel, switch mechanism for causing continuous operation of any chosen one of the first named devices, circuit closers located in the rim of the steering wheel, for causing temporary operation of a chosen device through said switch mechanism, and means whereby actuation of one of said last named circuit closers breaks any existing circuit for said continuous operation, while said last named circuit closer remains closed.

14. A control system for automobile devices, to be operated from the rim of the steering wheel and comprising, in combination: a plurality of electrical devices; electric circuits and a source of energy for the operation of the said devices; certain of said devices connected to be operated directly by means of a circuit closer located in the rim of the steering wheel; switch mechanism for causing continuous operation of a chosen one of the remaining devices, a circuit closer located in the rim of the steering wheel and connected for causing temporary operation of a chosen device through said switch mechanism and means whereby actuation of the last named circuit closer breaks any existing circuit for said continuous operation, while said circuit closer remains closed.

FRED I. GETTY.